United States Patent [19]

Curry et al.

[11] 4,369,081
[45] Jan. 18, 1983

[54] METHOD OF SECURING A FOAM LAYER TO A BELT

[75] Inventors: Thomas H. Curry; William A. Luciano, both of Clifton Park, N.Y.

[73] Assignee: Albany International Corp., Albany, N.Y.

[21] Appl. No.: 298,029

[22] Filed: Aug. 31, 1981

[51] Int. Cl.³ .................. B32B 3/00; D04H 1/08; B32B 5/06
[52] U.S. Cl. .................. 156/148; 156/304.4; 156/304.1; 156/304.7; 156/93; 428/101; 428/234; 428/235; 428/300; 428/309.9; 428/311.1; 162/358; 162/DIG. 1; 198/847; 156/155
[58] Field of Search .............. 139/383 A; 162/358, 162/DIG. 1, 348; 28/102, 109, 110, 123, 124, 159; 428/58, 101, 105, 113, 114, 234, 235, 300, 309.9, 311.1; 34/243 R, 123; 156/148, 137, 93, 72, 157, 155, 304.1, 304.3, 304.4, 304.7, 304.2, 304.6; 198/847

[56] References Cited

U.S. PATENT DOCUMENTS

| | | | |
|---|---|---|---|
| 3,059,312 | 10/1962 | Jamieson | 428/234 |
| 3,352,739 | 11/1967 | Blue | 428/235 |
| 3,532,588 | 10/1970 | Newman | 428/309.9 |
| 4,119,753 | 10/1978 | Smart | 428/234 |
| 4,271,222 | 6/1981 | Hahn | 162/DIG. 1 |

FOREIGN PATENT DOCUMENTS 902503 4/1960 United Kingdom ............ 156/304.1

Primary Examiner—Edward C. Kimlin
Assistant Examiner—F. K. Wine
Attorney, Agent, or Firm—Kane, Dalsimer, Kane, Sullivan and Kurucz

[57] ABSTRACT

A method for manufacturing a laminated foam-fabric endless belt is disclosed. A foam strip is joined endless and then stretched over an endless substrate fabric. A layer of batting is needled into the foam and substrate fabric to form an integral laminated belt. Several layers of batting may be applied to increase the weight of the belt to a desired level.

13 Claims, 7 Drawing Figures

METHOD OF SECURING A FOAM LAYER TO A BELT

BACKGROUND OF THE INVENTION

The field of the invention relates to methods for securing a foam layer to a belt.

Laminated belt structures including base fabrics having polymeric foams attached thereto have been successfully employed for filtration and for other applications. U.S. Pat. No. 3,059,312 discloses such a belt having two spaced outer layers of a textile fabric and an intermediate layer of synthetic resin foam. The layers are united by the penetration of fibers of one of the two textile fabrics through the foam and through the other textile fabric. Laminated belts such as the one described above can be used as "felts" in the papermaking industry.

SUMMARY OF THE INVENTION

The invention is directed to a method for forming a laminated belt including at least one foam layer. A foam belt is jointed endless and then slipped over an endless base fabric. If the base fabric has a larger width than the foam belt, one or more such belts may be joined along their longitudinal edges prior to positioning them over the base fabric. The length of the foam belt may be smaller than the length of the base fabric to provide a snug fit.

After positioning the foam belt and base fabric in the manner described above, the belt is secured to the fabric by needling a layer of batting to the entire fabric. Additional such layers can be needled to the structure to obtain the desired weight.

DETAILED DESCRIPTION OF THE INVENTION

Figure 1:
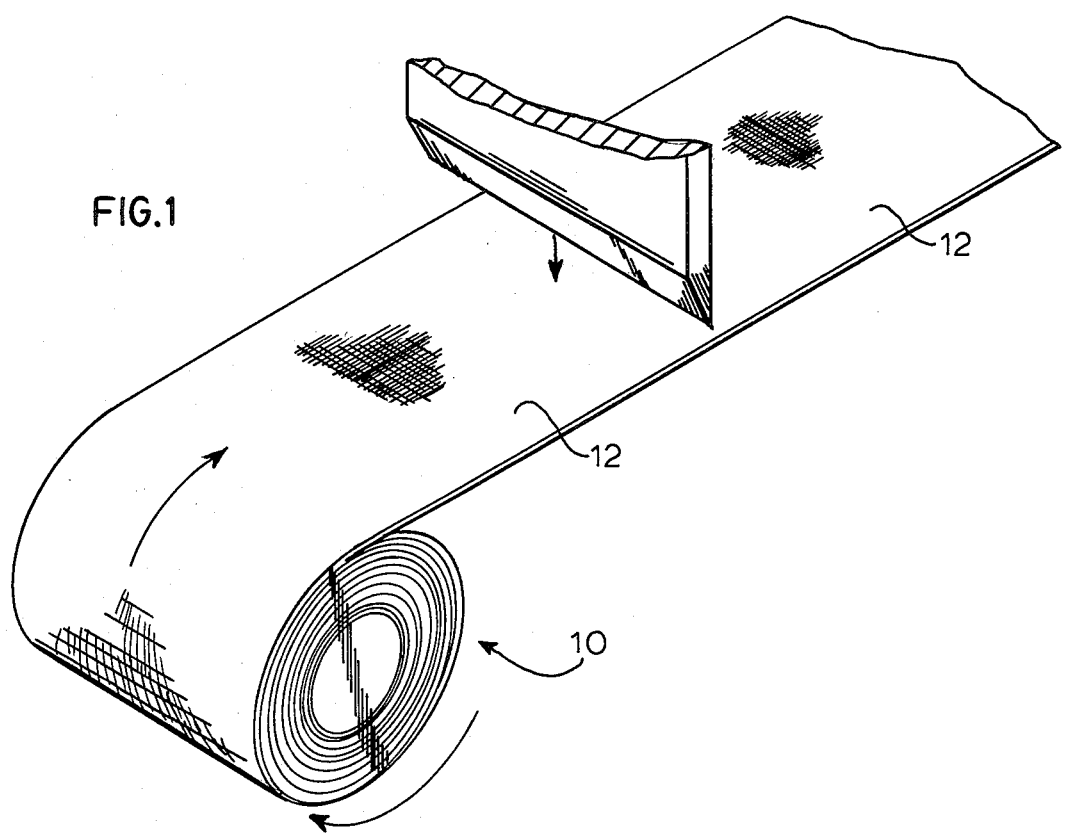
FIG. 1 is a perspective view of a roll of foam and a cutting blade for cutting strips therefrom.
Figure 2:
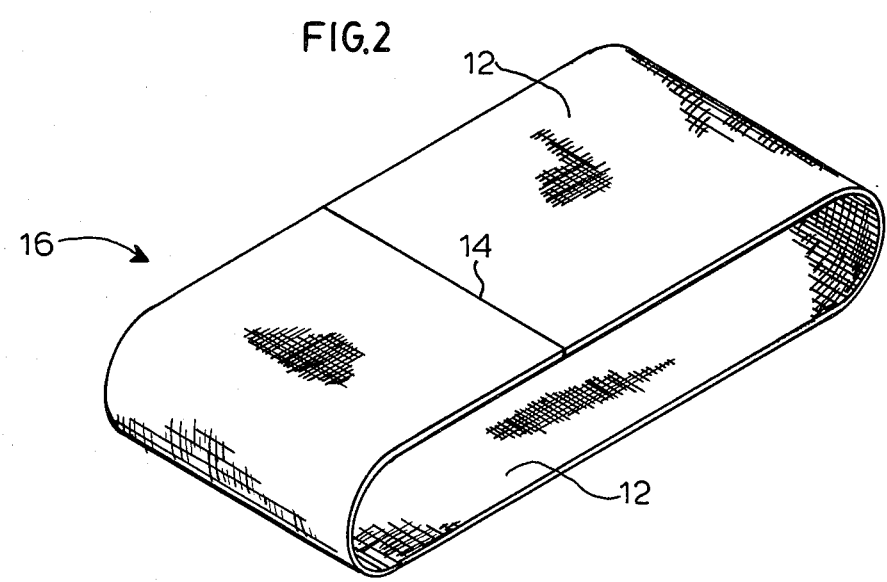
FIG. 2 is a perspective view of a strip of foam which has been formed into an endless foam belt.

FIGS. 1-6 illustrate sequentially the steps followed for producing a laminated belt according to the invention. A roll 10 of polymeric foam 12 is provided and a strip of desired length is cut therefrom. The opposite ends of the strips are joined along a seam 14 to provide an endless belt 16 as shown in FIG. 2. Joining may be accomplished either by sewing the ends or using a common adhesive. Water soluble adhesives are recommended as they can be washed away after the foam is secured to a substrate. If the ends are sewn, the use of a light weight water soluble yarn is preferred so a stepwise washing will remove the yarn after the needling step. Alternatively, an insoluble yarn of such small size that it may secure the foam belts to each other without altering other fabric characteristics, may be used.

Figure 3:
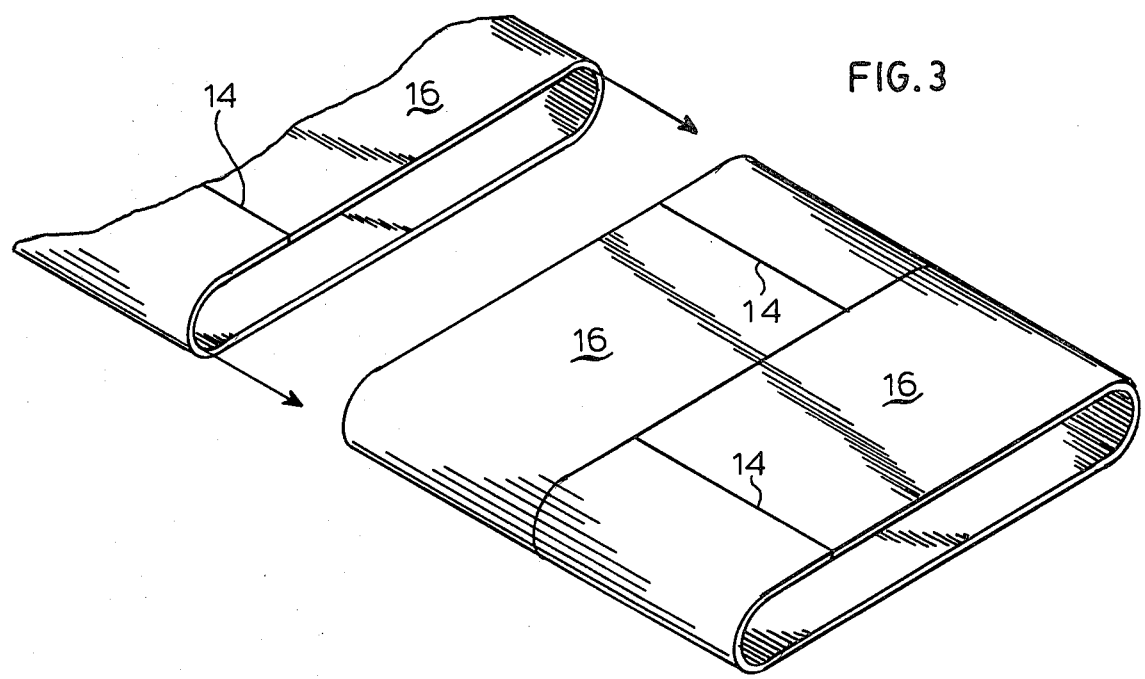
FIG. 3 is a perspective view of a plurality of endless foam belts being joined along their longitudinal edges.

Since rolls of foam are typically only about 60" wide when purchased commercially, several endless foam belts 16 are joined along their longitudinal edges by forming either a line or a series of spot seams with suitable adhesives. FIG. 3 illustrates the resulting structure.

Figure 4:
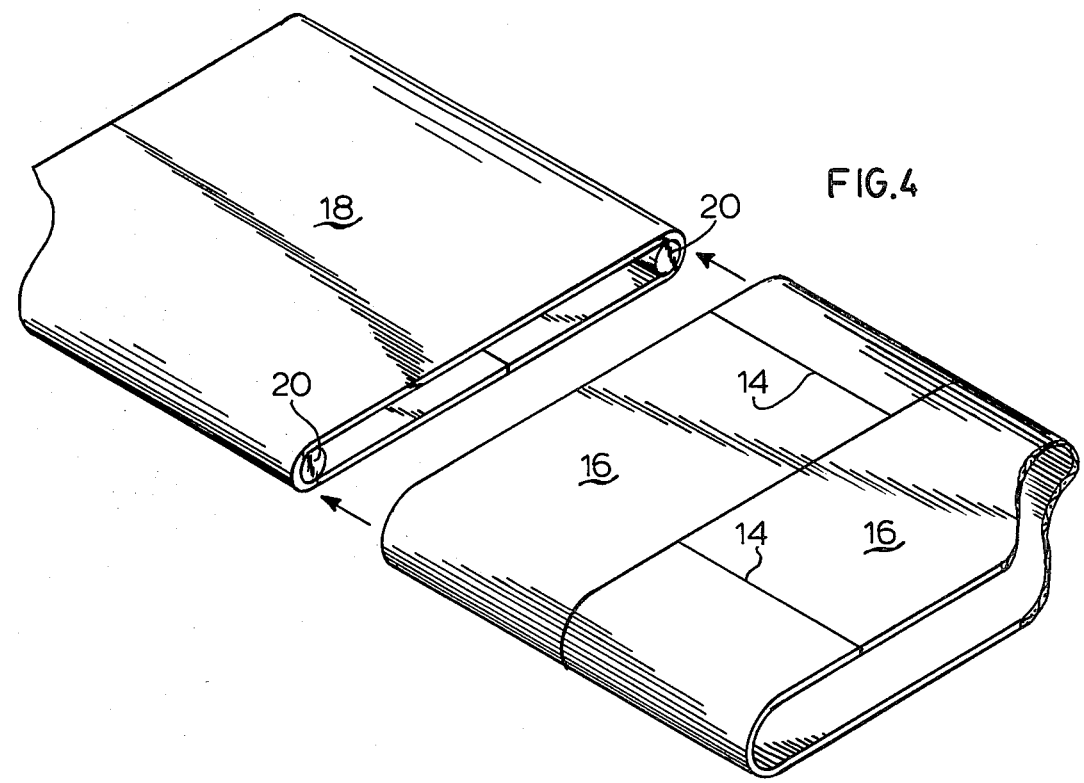
FIG. 4 is a perspective view of a composite foam belt being applied over an endless base fabric.
Figure 5:
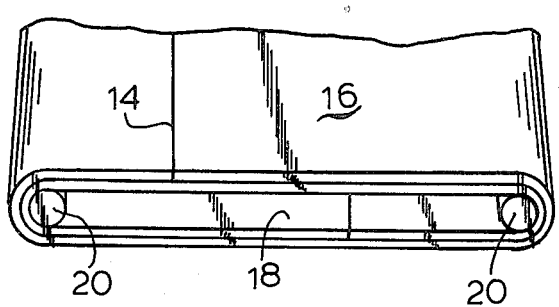
FIG. 5 is a perspective view of an endless foam belt positioned over an endless base fabric.

The longitudinally joined foam belts 16 are then slipped over an endless base fabric 18 as shown in FIG. 4. The base fabric may be over two hundred inches wide, and the joined belts should be of comparable or equal width. Foam belts of equal or unequal width may be combined to arrive at the desired dimensions. Since the belts 16 have elastomeric properties, they may have a smaller circumference than the base fabric 18 over which they are positions. This produces a snug fit free of any sagging problems. The base fabric is positioned about a pair of rollers 20 to facilitate the mounting of the foam belts.

Figure 6:
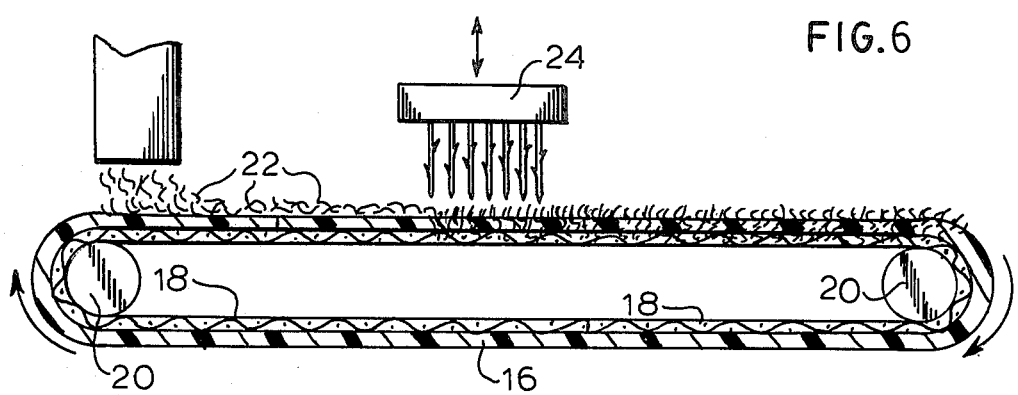
FIG. 6 is an elevational view illustrating the needling of a batt of fibers to the structure shown in FIG. 5.
Figure 7:
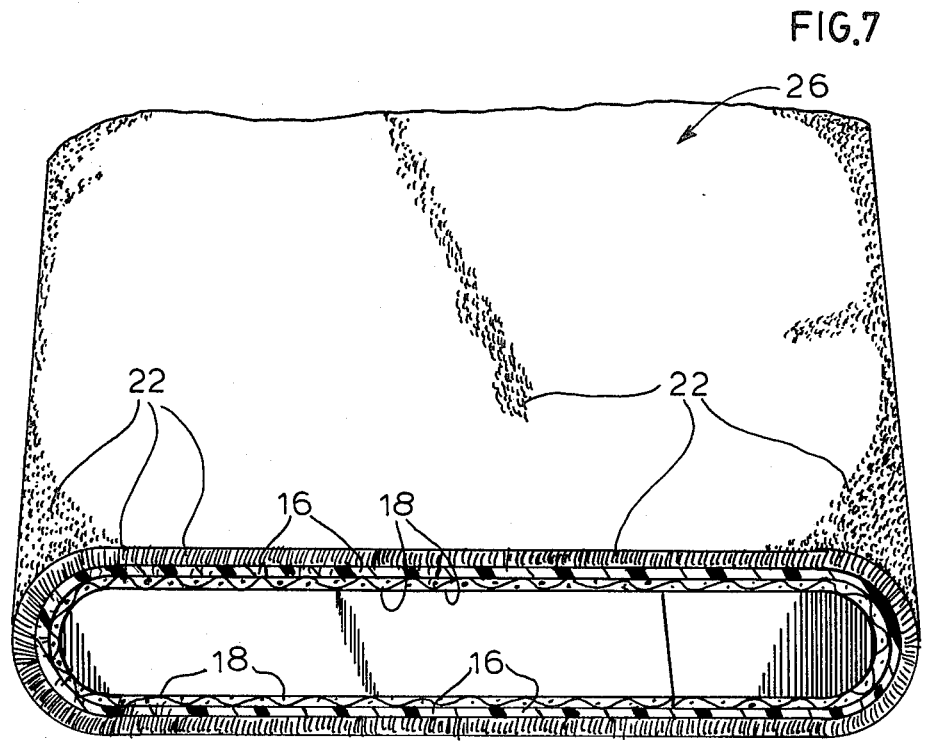
FIG. 7 is a perspective view of the product obtained after the needling operation shown in FIG. 6.

The foam belts 16 are then needled to the base fabric 18 as shown in FIG. 6. A layer of batting 22 is applied to he exterior surface of the belts. The batting is then needled to the foam belts and base fabric by means of a needling apparatus 24. The needling process may be continued until the resulting laminated belt 26 reaches a desired weight.

After the foam is secured to the fabric, it may be washed to remove the water soluble adhesives employed in joining the foam belts endless and/or joining them along their longitudinal edges.

What is claimed is:

1. A method for manufacturing an endless laminated felt belt for papermaking, comprising the steps of:
    providing an endless substrate fabric belt;
    slipping an endless foam belt over said substrate fabric; and
    needling a layer of batting through said foam belt and said substrate fabric thereby producing an integral laminated belt.

2. A method as defined in claim 1 wherein said foam belt has elastomeric properties and is of smaller circumference than said substrate fabric.

3. A method as defined in claim 1 wherein said foam belt has substantially the same width as said fabric belt.

4. A method as defined in claim 1 wherein said foam belt includes a plurality of endless foam belt sections secured to each other along adjacent longitudinal edges.

5. A method as defined in claim 1 wherein said foam belt is a polymeric foam belt.

6. A method as defined in claim 4 wherein said foam belt sections are secured to each other by a water soluble adhesive, and including the step of washing said adhesive away after the needling step.

7. A method as defined in claim 4 wherein said foam belt sections are secured to each other by a water soluble yarn, and including the step of washing said yarn away after the needling step.

8. A method for manufacturing an endless laminated felt belt for papermaking, comprising the steps of:
    providing a plurality of strips of foam having opposing edge portions;
    joining the opposing edge portions of each respective strip to provide a plurality of endless foam belts;
    securing the endless foam belts to each other along respective longitudinal edge portions to form a single endless foam belt;
    positioning said single endless foam belt around an endless substrate fabric; and needling a layer of batting through said single endless foam belt and said substrate fabric thereby producing an integral laminated belt.

9. A method as defined in claim 8 wherein said single endless foam belt has elastomeric properties and is of smaller circumference than said substrate fabric, and wherein the positioning of said single endless foam belt around said endless substrate fabric involves stretching said single endless foam belt and slipping it over said substrate fabric to produce a snug fit.

10. A method as defined in claim 8 including the steps of assembling and securing said plurality of endless foam belts such that said single endless foam belt formed therefrom has substantially the same width as said substrate fabric.

11. A method as defined in claim 8 wherein said endless foam belts are of polymeric material.

12. A method as defined in claim 8 wherein said foam belts are joined endless and secured to form said single endless foam belt by a water soluble adhesive, said method including the step of washing said adhesive away after the needling step.

13. A method as defined in claim 8 wherein said foam belts are joined endless and secured to form said single endless foam belt by a water soluble yarn, said method including the step of washing said yarn away after the needling step.

* * * * *